United States Patent
Udall et al.

(10) Patent No.: US 6,494,032 B2
(45) Date of Patent: Dec. 17, 2002

(54) DUCTED FAN GAS TURBINE ENGINE WITH FRANGIBLE CONNECTION

(75) Inventors: Kenneth F Udall, Derby (GB); John W Allen, Burton on Trent (GB); Stephen H Watson, Derby (GB)

(73) Assignee: Rolls-Royce plc, London (GB)

( * ) Notice: Subject to any disclaimer, the term of this patent is extended or adjusted under 35 U.S.C. 154(b) by 21 days.

(21) Appl. No.: 09/784,163

(22) Filed: Feb. 16, 2001

(65) Prior Publication Data

US 2001/0020361 A1 Sep. 13, 2001

(30) Foreign Application Priority Data

Mar. 11, 2000 (GB) .............................................. 0005772

(51) Int. Cl.[7] .................................................. F01D 5/02
(52) U.S. Cl. ............................. 60/223; 60/226.1; 415/9; 416/2
(58) Field of Search ............................... 60/223, 226.1; 415/9; 416/2

(56) References Cited

U.S. PATENT DOCUMENTS

| | | | |
|---|---|---|---|
| 4,452,567 A | * 6/1984 | Treby et al. | 415/9 |
| 4,900,221 A | 2/1990 | Ciokajlo | |
| 5,433,584 A | * 7/1995 | Amin et al. | 415/9 |
| 6,109,022 A | * 8/2000 | Allen et al. | 60/223 |
| 6,240,719 B1 | * 6/2001 | Vondrell et al. | 60/223 |

FOREIGN PATENT DOCUMENTS

| | | | |
|---|---|---|---|
| GB | 2 079 402 A | | 1/1982 |
| GB | 2 130 340 A | | 5/1984 |
| GB | 2322914 A | * | 9/1998 |
| GB | 2 324 833 A | | 11/1998 |
| GB | 2 326 679 A | | 12/1998 |

* cited by examiner

Primary Examiner—Ted Kim
(74) Attorney, Agent, or Firm—W. Warren Taltavull; Manelli Denison & Selter

(57) ABSTRACT

A ducted fan gas turbine engine comprises a fan 12 mounted on a first shaft 16 and a compressor mounted on a second shaft 43. The shafts are coaxial both with each other and with said engine longitudinal axis 15. The shafts are mounted in roller bearings 21, 40. The first bearing 21 carrying the upstream part of the first shaft and the second bearing 40 carrying the upstream part of the second shaft. Both bearings are attached to a structure 26 which comprises an axial sleeve and a front frustoconical portion and a rear radially stiff but axially flexible frustoconical portion and is attached to the engine casing 36. The front frustoconical portion is frangibly attached to the front part of the axial sleeve 28. In the event of damage to the fan the frangible connection breaks and the first shaft is allowed to orbit about the engine longitudinal axis 15. The rear member 32 is swashingly non-linear flexible and accommodates the out of balance radial loads transferred to it as couples during such an incident.

6 Claims, 4 Drawing Sheets

DUCTED FAN GAS TURBINE ENGINE WITH FRANGIBLE CONNECTION

FIELD OF THE INVENTION

This invention relates to a ducted gas turbine engine. More particularly this invention is concerned with the preservation of a gas turbine engine after damage to its fan.

BACKGROUND OF THE INVENTION

Ducted fan gas turbine engines conventionally comprise a core engine which drives a comparatively large diameter propulsive fan positioned at the upstream end of the core engine. By the nature of the position of the fan at the front of the engine it is most vulnerable to damage by ingestion of debris. Such ingestion of foreign bodies can cause a fan blade to partly or fully break off thus leaving the fan operating out of balance. This usually necessitates the shutting down of the engine to minimise the damage. However the imbalance in the fan created by the part or full blade loss generates extremely high radial loads which must be at least partially absorbed as the engine is run down to windmilling speed. Windmilling speed is the speed at which the engine rotates in a non-operative condition as a result of its motion through atmosphere.

Prior proposals for dealing with such imbalance are disclosed in prior patents GB 2079402 and GB 2130340. Both these patents disclose arrangements where load limitation is achieved by the use of 'fuse pins'. Typically the main bearing supporting the fan shaft is connected to the remainder of the engine structure in the region of the fan by a plurality of axially extending fuse pins. The pins fracture in shear upon a major fan imbalance allowing the fan and its shaft to orbit about the engine's longitudinal axis. This continues as the engine is allowed to run down to windmilling speed.

However the vibration resulting from the fan imbalance that still exists at windmilling speed can still be extremely severe. This is due mainly to speed coincidence with the reduced natural frequency of vibration of the fan because of the lack of radial stiffness of the fan assembly after fusing of the bearing support load path.

A prior proposal for dealing with such fan vibration during windmilling is disclosed in prior patent GB 2326679. This prior patent discloses an arrangement where a first bearing carrying the upstream part of the fan shaft is connected to the fixed engine structure via a frangible support member. A second bearing carrying the upstream part of the intermediate pressure compressor shaft is attached to the fixed structure of the engine casing by a hairpin shaped resilient support member which is also attached to the mounting of the first bearing.

In the event of the fan suffering damage the frangible support member breaks which ensures that most of the engine is protected from major damage arising from out-of-balance forces and that the fan is able to orbit about the engine longitudinal axis. However, additionally the natural frequency of the fan is raised by the hairpin member providing a resilient connection between the fan and hub structure. The forcing frequency of the windmilling fan should thus be outside the resonance range. The resilient hairpin member also absorbs out-of-balance radial loads.

One problem, arising from the aforementioned arrangement described in GB 2326679 is that the second bearing supporting the intermediate pressure compressor shaft is itself supported by the flexible hairpin connection between the bearings and the casing structure. During normal running the load path provided by the elastic structure between the IP bearing housing and the hub structure is undesirably long and too flexible to provide good support for the IP compressor shaft.

There is a need therefore for a flexible structure which not only provides the advantages disclosed in GB 2326679 but also provides good support for the IP compressor shaft.

A need has also been identified for an arrangement which accommodates the large deflections during the initial stages of a fan-blade-off incident but would also be able to offer stiff support at the smaller deflections during windmilling.

SUMMARY OF THE INVENTION

According to the present invention there is provided a ducted fan gas turbine engine having a longitudinal axis and including a propulsive fan mounted on a first shaft and a compressor mounted on a second shaft, said shafts being normally coaxial both with each other and with said engine longitudinal axis, and respectively supported at their upstream ends by axially spaced apart first and second bearing members, said first bearing member being supported from the fixed structure of said engine by support means and being interconnected with said second bearing member by an axial sleeve wherein said support means comprises an axially flexible and radially stiff frustoconical member interconnecting said engine casing and said second bearing member.

Preferably said frustoconical member is positioned at the downstream end of said axial sleeve.

Preferably said flexible frustoconical member is hollow.

BRIEF DESCRIPTION OF THE DRAWINGS

The invention will now be described with reference to the accompanying drawings in which.

DETAILED DESCRIPTION OF THE INVENTION

Figure 1:
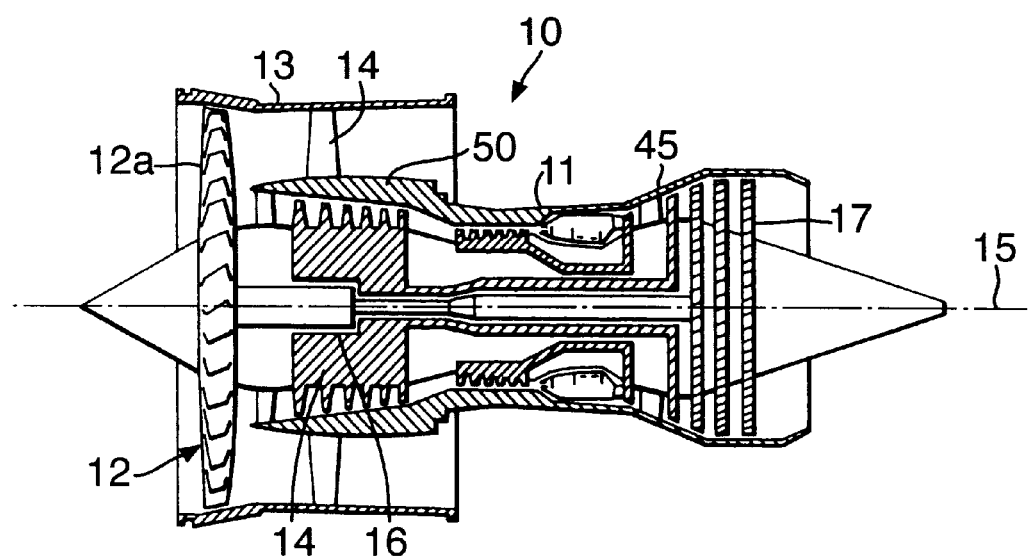
FIG. 1 is a schematic sectioned side view of a ducted fan gas turbine engine in accordance with the present invention.

With reference to FIG. 1 a ducted fan gas turbine engine generally indicated at 10 is of mainly conventional construction. It comprises a core engine 11 which functions in the conventional manner to drive a propulsive fan 12 mounted at the upstream end of the core engine 11 (the term upstream as used herein is with respect to the general direction of gas flow through the engine 10, that is, from left to right as viewed in FIG. 1). The propulsive fan 12 comprises an annular array of radially extending aerofoil blades 12a and is positioned within a fan casing 13 which is supported from the core engine 11 by an annular array of generally radially extending outlet guide vanes 14. The ducted fan gas turbine engine 10 has a longitudinal axis 15 about which its major rotational parts rotate.

Figure 2:
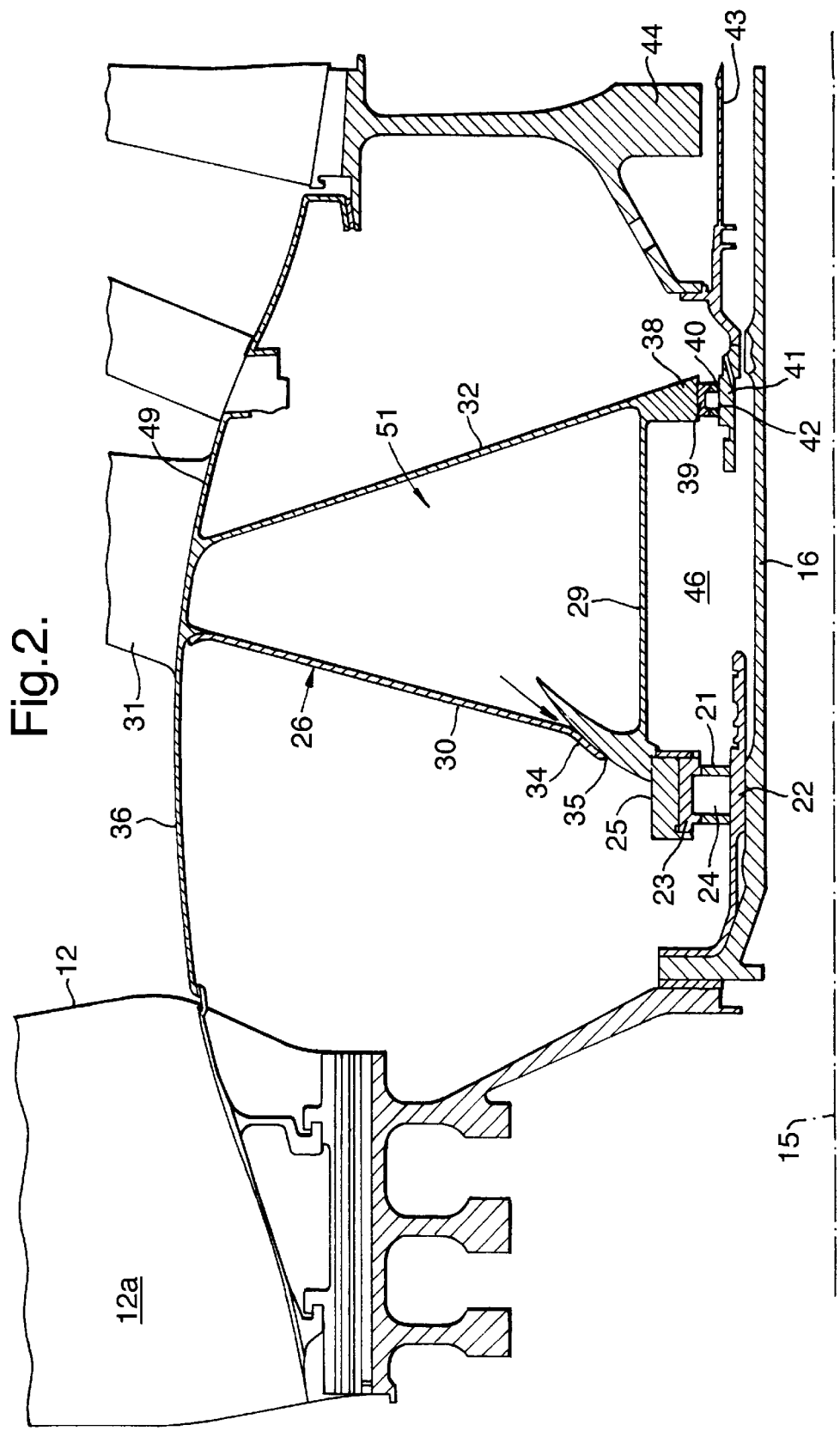
FIG. 2 is a sectioned side view on an enlarged scale of a portion of the ducted fan gas turbine engine shown in FIG. 1.

The fan 12 is mounted on a first shaft 16 which under normal load circumstances is coaxial with the engine longitudinal axis 15 and which is driven in the conventional manner by the low pressure turbine 17 of the core engine 11. The manner in which the upstream region of the first shaft 16 is supported from the fixed structure of the engine 10 can be seen if reference is now made to FIG. 2.

The first shaft 16 extends almost the whole length of the ducted fan gas turbine engine 10 to interconnect the fan 12 and the low pressure turbine 17 of the core engine 11. The first shaft 16 is supported from the remainder of the core engine 11 by a number of bearings. The first roller bearing 21 comprises a radially inner race 22 which is located upon the external surface of a portion of the first shaft 16, a radially outer race 23 and a plurality of roller bearing elements 24 which are interposed in an annular array between the inner and outer races 22 and 23.

Figure 3:
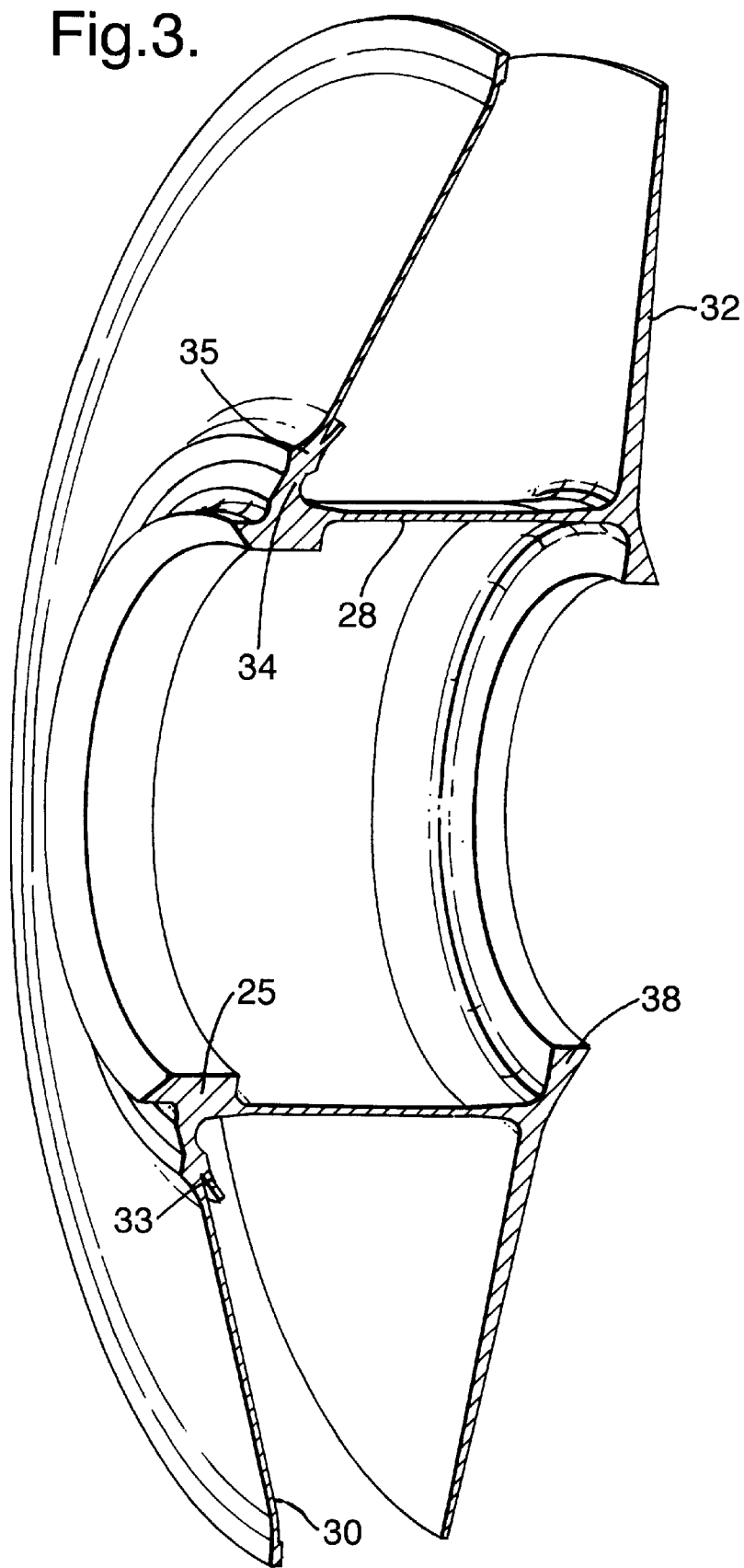
FIG. 3 is a three dimensional representation of a portion of the ducted fan gas turbine engine as shown in FIG. 1.
Figure 4:
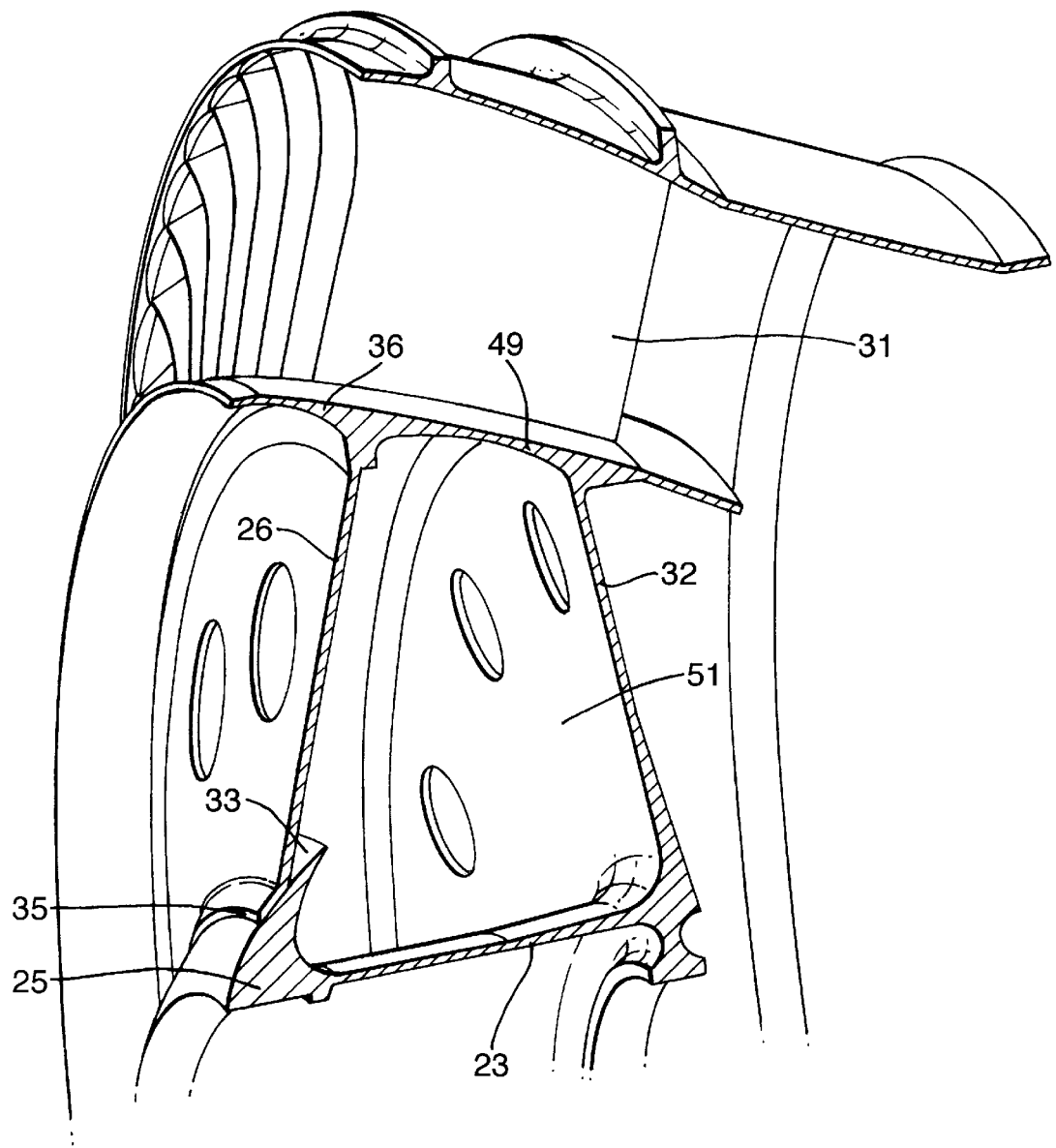
FIG. 4 is a three dimensional representation of the portion of the ducted fan gas turbine engine as shown in FIG. 2.

The radially outer race 23 is carried by a support ring 25, which is attached to a hollow toroidal box shaped structure 26. This structure can be seen more clearly by referring to FIG. 3.

The structure 26 comprises a central cylindrical axial sleeve 28 connecting a front portion 30 and a rear portion 32. Each portion 30, 32 comprises a dished disc of frustoconical configuration. Also the front cone shaped disc 30 is clamped to the engine casing 36 and is easily removable during, for example, an engine service. This allows easier access to chamber 51 and the parts located therein. The cylindrical portion 28, when connected only to the rear cone portion 32, is more radially flexible than the front cone portion 30 and provides radial load absorption during a fan blade off incident accommodating out of balance radial loads. Rear portion 32 is also located on the second bearing support ring 38. The support ring 38 carries the radially outer race 39 of second roller bearing 40. The second roller bearing 40 is now provided with good support during normal use of the engine and during a fan blade off incident, since the load path provided by the rear cone portion 32 between the second bearing and the casing 36 is relatively short and radially stiffer than that provided by the previous hairpin arrangement of GB 2326679.

The upstream end of axial sleeve 28 is frangibly attached to the front portion of the structure 26 via a fuse portion 33. The fuse portion 33 is positioned directly above the first roller bearing 21.

The fuse 33 comprises an area of the structure 26 where two portions of the structure 26 are frangibly attached to one another. One fuse face 34 is located at the upstream end of the axial sleeve 28 and the second fuse face 35 is located at one end of front portion 30. Fuse face 34 is frustospherically shaped and abuts the second fuse face 35 so as to provide a sliding motion when the fuse is broken (during a fan-blade-off incident). The two fuse faces 34, 35 are connected by suitable means (not shown), for example a bolt, which may fracture and enable the fuse portion 33 to fracture under a predetermined amount of force equivalent to that suffered during a fan-blade-off incident.

The second roller bearing 40 is coaxial with the first roller bearing 21 and the engine longitudinal axis. The bearings 21, 40 are axially spaced apart from each other. The second roller bearing 40 supports the upstream end of a second shaft 43 which is hollow and is located radially outwardly of the first shaft 16. The second shaft 43 carries the intermediate pressure compressor 44 and the intermediate pressure turbine 45 of the core engine 11 (as can be seen in FIG. 1).

The radially outer extents of the front 30 and rear portions 32 are interconnected by an annular member configured to define the radially inner platforms 49 of an annular array of stator aerofoil vanes 31 which are positioned immediately downstream of the fan 12. The vanes 31 are attached, in turn, to the outer casing 50 of the core engine 11.

The axial sleeve 28 co-operates with the first shaft 16 to define an annular chamber 46 within which both first and second bearings 21, 40 are contained. The chamber 46 provides convenient means for containing lubricating oil directed to the bearings 21, 40. The oil is derived in a conventional manner from a suitable oil supply.

In the event of the fan 12 suffering damage to one or more of its aerofoil blades 12a which places it significantly out-of-balance, considerable loads are transmitted from the first shaft 16 to the first bearing 21. This in turn places radial loads upon the fuse 33 which are sufficient to fracture the flexible structure 26 at the position where the fuse faces 33, 34 are connected.

The fracture of flexible member 26 at the fuse 33 ensures that most of the core engine 11 is protected from major damage arising from the out-of-balance radial loads exerted by the fan 12. However the fracture of the fuse 33 also results in the upstream end of the first shaft 16 no longer having rigid radial support. Thus the upstream end of the first shaft 16 proceeds to orbit about the engine longitudinal axis. This in turn then results in the bearing support ring 25 following that orbiting motion.

Conventionally following major fan damage the fuel flow to the engine 10 is discontinued and the fan 12 is allowed to run down to windmilling speed. However at windmilling speeds there is a likelihood of the fan 12 approaching its post fusing natural frequency of vibration which could result in the fan vibrating at or near its resonant frequency such that the integrity of the engine 10 is threatened.

A restoration force is applied to the shaft 16 by axial sleeve 28, carried on cone 32, which tends to act to restore a generally coaxial relationship between the first and second shafts 16 and 43. This helps to avoid the fan vibrating at the resonant frequency of the engine by raising that frequency.

During a fan-blade-off incident the out of balance radial loads at the bearing 24 are translated into axial couples at the bearing 40 by the cylinder 28 and are absorbed by the axially flexible rear face 32 of structure 26. This rear face 32 provides a bending 'S' shaped swashing movement under the out-of-balance axial couples. Normally a conventional 'Belleville' washer is only used in the axial sense, supporting axial loads but in this instance it is employed in an axial couple sense i.e. the flexible rear portion 32 providing radial load absorption at the bearing 24 by differential axial (couple) loading at the bearing 40. The outer rim of the frustoconical shaped rear portion 32 is connected to the engine casing 36 and the inner rim of the frustoconical shaped portion 32 is mounted around bearing 40. During the initial stages of a fan-blade-off incident rear face 32 provides high flexibility to absorb high radial deflections. The rear portion 32 is caused to provide relatively large S shaped swashing movement whilst absorbing the high radial deflections. However later, during the fan windmilling stage, rear portion 32 provides smaller S shaped swashing movements to accommodate the smaller radial loads at a higher stiffness, due to the steeper Belleville cone angle.

Thus the bending characteristics of rear portion 32 adapt to accommodate the changes in load conditions.

Advantageously the present invention provides good support for the intermediate compressor bearing 40 but also dispenses with the need for the additional hairpin spring arrangement disclosed in GB 2326679. As such the present arrangement is lighter and simple to manufacture, the bending characteristics of the Belleville washer shaped structure 32 not only provides good radial load absorption at the bearing 24 but also adapts itself to accommodate the changing radial loads during a fan damage or fan-blade-off incident.

We claim:

1. A ducted fan gas turbine engine having a longitudinal axis and fixed structure and including a propulsive fan, a compressor, a first shaft and a second shaft, said propulsive fan being mounted on said first shaft and said compressor being mounted on said second shaft, said shafts being normally coaxial both with each other and with said engine longitudinal axis, axially spaced apart first and second bearing members being provided to respectively support said first and second shafts at their upstream ends, first and second support means being provided to respectively support said first and second bearing members from said fixed structure of said engine, and axial sleeve means being provided to interconnect said first and second bearing members and additionally interconnect said first and second support means, the interconnection between said first support means and said axial sleeve means being frangible, said second support means comprising an axially flexible and radially stiff frustoconical member to facilitate axial flexibility thereof and said first support means comprising a frustoconically shaped member.

2. A ducted fan gas turbine engine as claimed in claim 1 wherein said frustoconical shaped member positioned at the downstream end of said axial sleeve.

3. A ducted gas fan turbine engine as claimed in claim 1 wherein said axial sleeve has an upstream end and the upstream end of said axial sleeve comprises a flange portion, said flange portion being frangibly attached to said first support means.

4. A ducted gas fan turbine engine as claimed in claim 1 wherein said first and second support means comprise a downstream and an upstream frustoconical shaped member and said upstream member is radially stiffer than said downstream frustoconical shaped member.

5. A ducted fan gas turbine engine as claimed in claim 1 wherein said first and second support means are formed from a titanium alloy.

6. A ducted fan gas turbine engine as claimed in claim 1 wherein said engine is a three shaft engine comprising said first shaft carrying said fan and a low pressure turbine, a second shaft carrying an intermediate pressure compressor and an intermediate pressure turbine and a third shaft carrying a high pressure compressor and a high pressure turbine.

* * * * *